Patented July 30, 1940

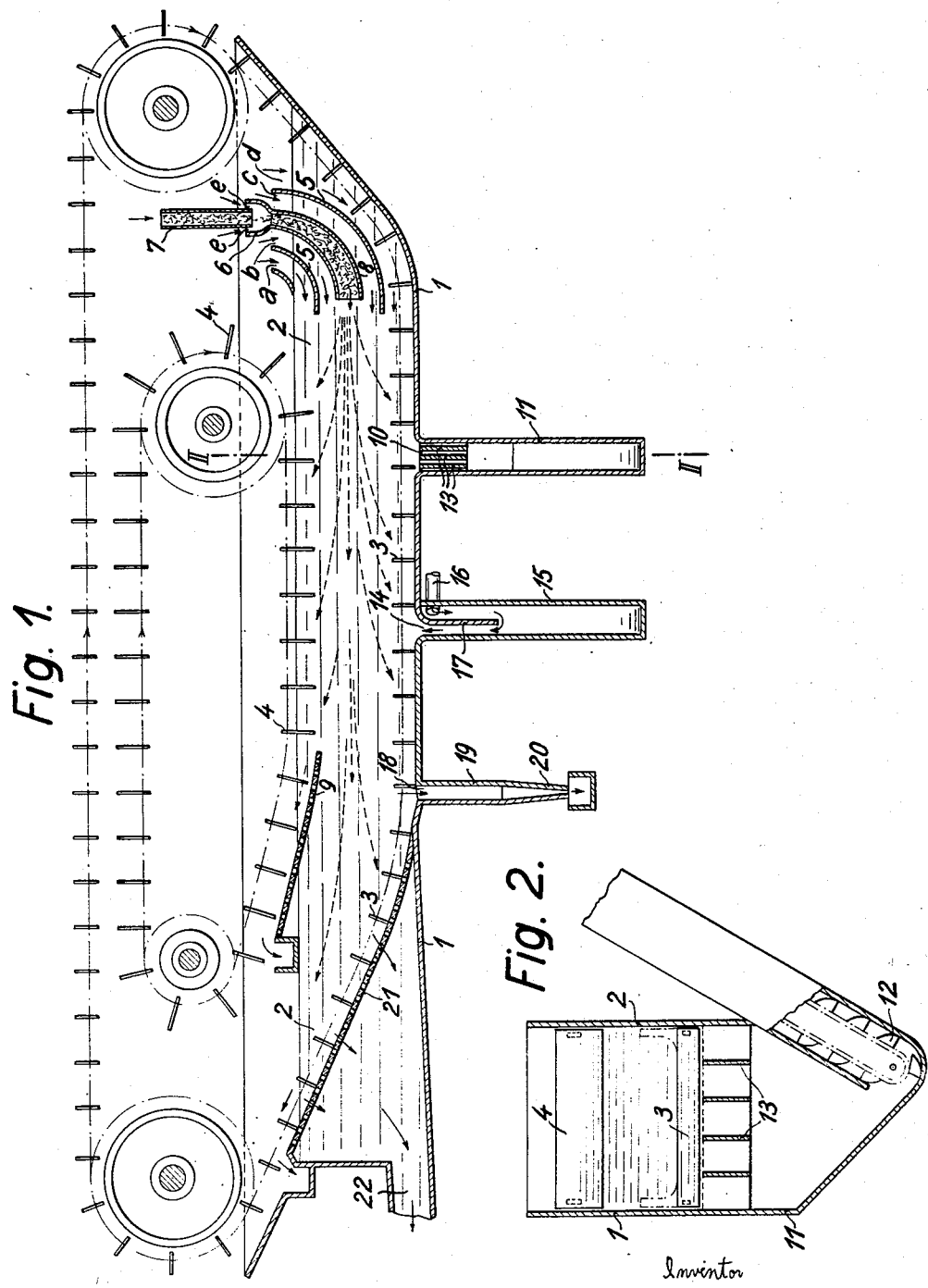

2,209,618

UNITED STATES PATENT OFFICE 2,209,618

PREPARING BULK MATERIAL AND APPARATUS THEREFOR

Walter Vogel, Essen, Germany, assignor to Fried. Krupp Aktiengesellschaft, Essen-on-the-Ruhr, Germany Application December 12, 1936, Serial No. 115,522
In Germany December 14, 1935

8 Claims. (Cl. 209—156)

This invention relates to an improved process of preparing, that is, classifying bulk material, such as coal or ores, according to the specific gravity of its particles, and to an apparatus for carrying on the process.

Various processes have been developed which have for their object the preparation of bulk material, such as coal, ores or the like, according to specific gravity, and in which a heavy separation liquid is made use of. As such heavy liquid there have been proposed organic liquids, solutions, in particular of calcium chloride, and, finally, suspension liquids. In all these processes use is made more or less of a trough-shaped vessel filled with the heavy liquid, the material to be prepared being fed to the surface of or into the liquid. The separation of the particles of the material takes place by the lighter particles rising to the surface and there being mechanically withdrawn by scrapers or similar conveying devices, whilst the heavier particles sink down in the trough and are withdrawn from there by means of bucket conveyors, sluices or other suitable devices. In these separation processes, however, the difficulty arises that those particles of the material to be treated the specific gravity of which corresponds to that of the heavy liquid or differs therefrom only slightly neither rise nor sink, but in the course of time collect in the medium zone of the liquid and thereby seriously interfere with the separating operation. Various proposals have been made to overcome this drawback. In one of these proposals the desired separation is aimed at by supplying a current of heavy liquid in the midst of the vessel and by producing from this middle layer partial liquid currents one of which rises whilst another one descends and the object of which is to entrain these suspended particles. With this method, however, accumulation of particles may likewise occur in the zone of the rising current, namely of those particles which in the liquid would reach a velocity of fall which is equal to that of the rising current. This phenomenon is apparent to a particularly great extent, when material of comparatively small grain sizes is to be prepared. Furthermore, the selectivity is reduced thereby, which is a serious drawback in cases where a particularly pure product is desired. Moreover, this process does not permit of a plurality of products being obtained in one single operation.

In a more recent process the attempt is made to avoid accumulation of such suspended particles in the liquid by means of a horizontal liquid current flowing through the trough. Although in this case the above-mentioned difficulties are reduced, they arise again to the same extent in the layers below the horizontal current.

All these known processes suffer from the difficulty of governing the conditions of flow of the separation liquid, which is a particularly serious drawback when very pure products are to be obtained by the separation process.

Now the present invention relates likewise to a process for classifying bulk material according to the specific gravity by means of a heavy separation liquid. The present process differs from all above-mentioned known processes primarily and fundamentally by the fact that here a heavy liquid is led through a trough in an as far as possible laminar flow. In order to obtain this laminar flow, that is a flow which as far as possible is free from whirls, according to the invention conveying devices are provided in the trough at the bottom and at the side walls, such as scraper chains, shovel or rake chains or the like, which are moved at a velocity which corresponds as exactly as possible to the average velocity of the liquid.

According to a further idea of the invention these conveying devices are utilized simultaneously for discharging the various separated sorts of particles of the material treated. The invention thus substantially consists in the generation of an as far as possible laminar horizontal flow of a heavy liquid within a trough, this flow taking along with it the medium particles, if any, which after the floated and sunk particles have been caught and withdrawn in one or several stages, have neither floated nor sunk, and permitting of the separate recovery of these suspended particles. The invention further comprises the use of the said discharging devices for securing the laminar flow, by adapting their movement as far as possible to that of the liquid.

Troughs with or without a scraping device at the bottom have already been proposed as preparing devices, it is true, but these appliances do not operate with heavy liquid, but, on the other hand, with high velocities of flow and with intentionally whirled current, the scrapers being moved against the current and serving merely for discharging the material. In this process, which is not a float and sink process, the separation of the different particles does not depend on the specific gravity only, but, in addition, on the size and shape of the grains, so that the material is spared but little and, among other drawbacks, only a very coarse selectivity is obtained.

Finally, a process is already known, in which at the bottom of a comparatively short tank and on the surface of the heavy liquid operates a conveying device. In this process, too, there is no laminar whirlless flow in the vessel, first of all for want of regulation of the supply and withdrawal of the liquid. In particular, no separate discharge of the suspended medium particles, which neither have floated nor sunk, is possible or provided. On the contrary, the sinking particles are withdrawn separately by a conveying device at the bottom of the vessel, whilst the whole remainder, that is the floating and suspended particles together, is removed by means of another special conveyor the scrapers of which substantially extend over the whole cross sectional area of the vessel. This latter discharge takes place at the end of the vessel, from which point the liquid flows back, so that also in this known process there is no current which after the floated and sunk particles have, respectively, been caught and discharged, would permit a separate recovery of the suspended particles which neither float nor sink.

In order that the invention may be clearly understood and readily carried into effect, it is described hereinafter in detail with reference to an embodiment of apparatus adapted for carrying on the invention. This apparatus is illustrated in the accompanying drawing, in which Figure 1 is a vertical longitudinal section of the apparatus, Figure 2 is a section on line II—II of Figure 1.

It is, of course, to be understood, that the apparatus illustrated is an example of construction only, and that the invention is not limited to the construction and use of the apparatus illustrated.

Referring to the drawing, 1 denotes a trough of rectangular cross section in which flows in a slow laminar current a heavy liquid 2 of a specific gravity which depends on the desired fineness of separation. At the bottom of the trough 1 travels an endless scraper conveyor 3 and on its surface a shovel conveyor 4. Both these conveyors travel at the same velocity at which the liquid 2 flows in the trough. The scrapers of the conveyor 3 may be designed so as to sweep also the side walls of the trough 1, see Figure 2, whereby both a more uniform flow is obtained and adhesion of the material treated to the side walls is avoided. In order to obtain a current without whirls, curved guide plates 5 are arranged at the place where the liquid is fed to the trough 1. The material to be prepared is fed mixed with heavy liquid through a hopper 6. Into this hopper 6 opens a narrower tube 7 through which the material is supplied. The hopper 6 further subsides into a tube 8 of rectangular cross section which slightly enlarges and takes the whole width of the trough 1. The walls of the tube 8 are curved at least approximately about the same virtual center as the guide plates 5. The spout of the curved tube 8 is situated about at half the height of the trough 1 and midway between the two guide plates 5. The heavy liquid is fed at the places denoted by a, b, c, d, Figure 1, in such a quantity and is drained from the trough 1 in the same quantity, that a uniform continuous flow of low velocity, say 2 cm./sec., is produced in the trough 1. Heavy liquid together with material fed through tube 7 is supplied at e through the hopper 6 in a quantity which is regulated in such a manner, that on the one hand, the mixture of material and heavy liquid leaves the tube 8 at the same average velocity which the liquid has at the beginning of its horizontal movement in the trough 1, whilst, on the other hand, the velocity in the hopper 6 and in the tube 8 must be sufficiently great to entrain also the lightest particles of the material supplied. With these conditions of flow has to be accorded also the quantity of heavy liquid fed at a, b, c, d.

Those particles which are specifically lighter than the liquid 2 rise in the trough 1 to the surface and are discharged by the shovel conveyor 4 over a screen 9. The heavier particles sink down within the liquid at greater or lower velocity according to their specific gravity and are caught at the bottom of the trough at suitable distances apart from the feed place by the scraper conveyor 3 and removed, the particles of highest specific gravity being discharged in the first section of the bottom of the trough. The paths of the particles of different specific gravity are marked in Figure 1 by dotted arrows. The withdrawal of the material may be effected through one or more slots provided in the bottom of the trough 1. Below these slots are arranged discharging devices which may be of different construction.

So, for example a vertical vessel 11 filled with heavy liquid is provided below the slot 10 which is situated next to the feeding device. In this vessel can readily sink the particles of highest specific gravity due to their excess weight over the liquid, without any flow of the liquid being required. These heaviest particles are discharged by means of a bucket conveyor 12, as illustrated in Figure 2. In order to prevent the liquid current flowing in the trough 1 from causing movement of the liquid in the vessel 11, vertical protective plates 13 are arranged in the slot 10.

Below the next slot 14 is likewise arranged a vertical vessel 15 to which is supplied a scavenging liquid of lower specific gravity, such as water in the case illustrated. In the upper portion of the vessel 15 the lighter liquid flows along a guide plate 17 downward and then upward and in so doing not only causes the particles of higher specific gravity to sink, with certainty, but effects simultaneously a reduction of the heavy liquid adhering to the particles discharged. In order that the discharging device 15 may not influence the composition and thus the specific gravity of the liquid in the trough 1, the device 15 is preferably disposed more toward the end of the trough. The same is the case with the discharging device arranged below the slot 18, since the quantity of liquid flowing out here influences the conditions of flow to a still greater extent, which is, however, of no importance at the end of the operative part of the trough. This latter discharging device consists of a simple vessel 19 which tapers so as to form a regulatable small opening 20 from which the discharged material flows out together with a small quantity of heavy liquid.

At the end of the trough 1 is disposed an inclinedly rising slotted screen 21 on which the medium particles suspended in the heavy liquid are retained whilst the liquid passes through the screen. These particles are removed by the scraper 3, and the liquid which escapes through the spout 22 is again fed to the feeding side.

The level at which the opening of the tube 8 is situated depends on the object aimed at by the preparation of the material. When it is intended to obtain as pure as possible the particles of the material which are of lower specific gravity than the separation liquid, the opening of the feeding device is disposed more toward the bottom of the trough 1 and a corresponding inverse arrangement is made for the reverse case. In the embodiment of apparatus illustrated the respective arrangement is made in such a manner as to gain a high grade coal from pre-washed coal.

The invention affords the possibility of preparing bulk material, in particular coal and ores, exclusively according to specific gravity with high selectivity and, moreover, of obtaining by one single apparatus several graduated products. The invention is particularly well suited for obtaining a high quality coal which is very low in ash.

What I claim and desire to secure by Letters Patent is:

1. Process for classifying bulk material composed of particles of several different specific gravities, which comprises feeding the bulk material substantially horizontally and cocurrently into an intermediate zone of a stream of liquid having a specific gravity similar to that of the particles of intermediate specific gravity, while causing the liquid to travel in an organized flow substantially in a single horizontal direction with approximately uniform velocity throughout the cross section of the stream, and separately removing from the stream the material floating near its surface, the material sinking to the bottom, and the material floating at an intermediate depth in the stream.

2. Process for classifying bulk material composed of particles of several different specific gravities, which comprises feeding the bulk material substantially horizontally and cocurrently into an intermediate zone of a stream of liquid having a specific gravity similar to that of the particles of intermediate specific gravity, while causing the liquid to travel in an organized flow substantially in a single horizontal direction with approximately uniform velocity throughout the cross section of the stream, and separately removing from the stream the material floating near its surface, the material sinking to the bottom, and the material floating at an intermediate depth in the stream, the vertical position in the stream at which the material is fed in being nearer the bottom or the top of the stream according to whether greater purity of the lightest or heaviest material is desired.

3. Apparatus for classifying bulk material composed of particles of several different specific gravities, comprising a trough containing a liquid of specific gravity similar to that of the particles of material of medium specific gravity, means for guiding make-up liquid into said trough near one end in such a way as to produce an organized flow of the liquid substantially in a single horizontal direction with approximately uniform velocity throughout the cross section of the liquid in the trough, means for draining liquid from the opposite end of said trough, means for feeding the material to be classified into the liquid in said trough adjacent the end where the make-up liquid is fed in, and means for removing the solids from the liquid in said trough in at least three separate classes, one containing the material which floats near the top of the liquid, another containing the material which settles to the bottom of the liquid within a certain distance from the feed-in end of the trough, and another containing the material which floats at an intermediate level of the liquid, said last means comprising conveyors travelling respectively near the surface and near the bottom of the liquid and cocurrent with the liquid at substantially the same rate as the flow of the liquid.

4. Apparatus for classifying bulk material composed of particles of several different specific gravities, comprising a trough containing a liquid of specific gravity similar to that of the particles of material of medium specific gravity, means for guiding make-up liquid into said trough near one end in such a way as to produce an organized flow of the liquid substantially in a single horizontal direction with approximately uniform velocity throughout the cross section of the liquid in the trough, means for draining liquid from the opposite end of said trough, means for feeding the material to be classified into the liquid in said trough adjacent the end where the make-up liquid is fed in, and means for removing the solids from the liquid in said trough in at least three separate classes, one containing the material which floats near the top of the liquid, another containing the material which settles to the bottom of the liquid within a certain distance from the feed-in end of the trough, and another containing the material which floats at an intermediate level of the liquid, said last means comprising conveyors travelling respectively near the surface and near the bottom of the liquid and cocurrent with the liquid at substantially the same rate as the flow of the liquid, and bearing broad vertically placed shovels adapted to control the flow of the liquid.

5. Apparatus for classifying bulk material composed of particles of several different specific gravities, comprising a trough containing a liquid of specific gravity similar to that of the particles of material of medium specific gravity, means for guiding make-up liquid into said trough near one end in such a way as to produce a substantially uniform flow of the liquid throughout the cross section of the liquid in the trough, means for draining liquid from the opposite end of said trough, means for feeding the material to be classified into the liquid in said trough adjacent the end where the make-up liquid is fed in, and means for removing the solids from the liquid in said trough in at least three separate classes, one containing the material which floats near the top of the liquid, another containing the material which settles to the bottom of the liquid within a certain distance from the feed-in end of the trough, and another containing the material which floats at an intermediate level of the liquid, said last means comprising conveyors travelling respectively near the surface and near the bottom of the liquid and cocurrent with the liquid at substantially the same rate as the flow of the liquid, and bearing broad vertically placed shovels adapted to control the flow of the liquid, the shovels on said bottom conveyor having portions extending upward along the side walls of the trough above the top edge of the shovels in the middle of the trough.

6. Apparatus for classifying bulk material composed of particles of several different specific gravities, comprising a trough containing a liquid of specific gravity similar to that of the particles of material of medium specific gravity, means for guiding make-up liquid into said trough near one end in such a way as to produce a substantially uniform flow of the liquid throughout the cross section of the liquid in the trough, means for draining liquid from the opposite end of said trough, means for feeding the material to be classified into the liquid in said trough adjacent the end where the make-up liquid is fed in, said last means comprising a curved chute with a vertical receiving end above the liquid level and a horizontal delivery end below the liquid level, said chute being constricted where it enters the liquid and gradually widening toward its delivery end, and means for removing the solids from the liquid in said trough in at least three separate classes, one containing the material which floats near the top of the liquid, another containing the material which settles to the bottom of the liquid within a certain distance from the feed-in end of the trough, and another containing the material which floats at an intermediate level of the liquid.

7. Apparatus for classifying bulk material composed of particles of several different specific gravities, comprising a trough containing a liquid of specific gravity similar to that of the particles of material of medium specific gravity, means for guiding make-up liquid into said trough near one end in such a way as to produce an organized flow of the liquid substantially in a single horizontal direction with approximately uniform velocity throughout the cross section of the liquid in the trough, means for draining liquid from the opposite end of said trough, means for feeding the material to be classified into the liquid in said trough adjacent the end where the make-up liquid is fed in, and means for removing the solids from the liquid in said trough in at least three separate classes, one containing the material which floats near the top of the liquid, another containing the material which settles to the bottom of the liquid within a certain distance from the feed-in end of the trough, and another containing the material which floats at an intermediate level of the liquid, said last means comprising a conveyor travelling with the liquid at the surface thereof and a conveyor travelling with the liquid along the bottom of the trough, said trough having at least one transverse slot in its bottom traversed by said last conveyor for receiving the heavier particles.

8. Apparatus for classifying bulk material composed of particles of several different specific gravities, comprising a trough containing a liquid of specific gravity similar to that of the particles of material of medium specific gravity, means for guiding make-up liquid into said trough near one end in such a way as to produce an organized flow of the liquid substantially in a single horizontal direction with approximately uniform velocity throughout the cross section of the liquid in the trough, means for draining liquid from the opposite end of said trough, means for feeding the material to be classified into the liquid in said trough adjacent the end where the make-up liquid is fed in, an inclined screen at the effluent end of said trough through which the liquid passes to said draining means, said screen extending from near the bottom of said trough approximately to the surface of the liquid, a conveyor travelling in the surface layer of the liquid for removing the material floating near the surface, a second conveyor travelling along the bottom of the trough with the liquid and up said screen and emerging from the surface of the liquid beyond said first conveyor, means for diverting heavier material from said second conveyor before it reaches said screen, and means to receive material moved up said screen by said conveyor.

WALTER VOGEL.